(12) United States Patent
Lee et al.

(10) Patent No.: US 12,518,147 B2
(45) Date of Patent: Jan. 6, 2026

(54) NEUROMORPHIC DEVICE AND OPERATING METHOD OF THE SAME

(71) Applicant: SAMSUNG ELECTRONICS CO., LTD., Suwon-si (KR)

(72) Inventors: Kyung Hwan Lee, Seoul (KR); Yong Seok Kim, Suwon-si (KR); Hyun Cheol Kim, Seoul (KR); Satoru Yamada, Yongin-si (KR); Sung Won Yoo, Hwaseong-si (KR); Jae Ho Hong, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1310 days.

(21) Appl. No.: 17/224,575

(22) Filed: Apr. 7, 2021

(65) Prior Publication Data

US 2021/0319293 A1 Oct. 14, 2021

(30) Foreign Application Priority Data

Apr. 10, 2020 (KR) .................. 10-2020-0044024

(51) Int. Cl.
*G06N 3/063* (2023.01)
*G06N 3/04* (2023.01)
(Continued)

(52) U.S. Cl.
CPC ............... *G06N 3/063* (2013.01); *G06N 3/04* (2013.01); *G11C 11/54* (2013.01); *G11C 13/0028* (2013.01); *G11C 13/003* (2013.01)

(58) Field of Classification Search
CPC .................................................. G11C 11/54
See application file for complete search history.

(56) References Cited

U.S. PATENT DOCUMENTS 9,117,749 B1 8/2015 Or-Bach et al.
9,847,129 B2 12/2017 Buchanan
(Continued)

FOREIGN PATENT DOCUMENTS

CN 110543937 A 12/2019
KR 10-2015-0034900 A 4/2015
KR 10-1692752 B1 12/2016

OTHER PUBLICATIONS

Taiwanese Office Action dated Jun. 1, 2021.

*Primary Examiner* — Mushfique Siddique
(74) *Attorney, Agent, or Firm* — Muir Patent Law, PLLC

(57) ABSTRACT

A neuromorphic device includes a synaptic array, including input lines extending in a first direction and receiving input signals independently from axon circuits connected thereto, bit lines extending in a second direction crossing the first direction and outputting output signals, cell strings that each include at least two resistive memristor elements and a string select transistor in series between an input line and a bit line, electrode pads stacked and spaced apart from each other between the input and bit lines and connected to the string select transistor and at least two resistive memristor elements, a decoder to apply a string selection signal or a word line selection signal to the electrode pads, and neuron circuits, each connected to one of the bit lines connected to one of the cell strings, summing the output signals, converting and outputting the summed signal when it is more than a predetermined threshold.

20 Claims, 11 Drawing Sheets

(51) Int. Cl.
*G11C 11/54* (2006.01)
*G11C 13/00* (2006.01)

(56) References Cited

U.S. PATENT DOCUMENTS

| | | | |
|---|---|---|---|
| 10,026,474 B2 | 7/2018 | Buchanan | |
| 10,079,059 B2 | 9/2018 | Buchanan | |
| 10,741,247 B1* | 8/2020 | Yeh | H10B 43/27 |
| 2016/0260481 A1* | 9/2016 | Miura | G11C 7/1006 |
| 2017/0148513 A1* | 5/2017 | Buchanan | H03G 1/0088 |
| 2017/0243109 A1 | 8/2017 | Hu et al. | |
| 2018/0082168 A1 | 3/2018 | Marukame et al. | |
| 2018/0082177 A1 | 3/2018 | Boybat Kara et al. | |
| 2018/0300618 A1 | 10/2018 | Obradovic et al. | |
| 2019/0019538 A1 | 1/2019 | Li et al. | |
| 2019/0213234 A1* | 7/2019 | Bayat | G11C 16/0483 |
| 2019/0354843 A1* | 11/2019 | Park | G11C 11/22 |
| 2019/0370639 A1 | 12/2019 | Yu | |
| 2020/0020396 A1* | 1/2020 | Kanamori | H10N 70/884 |
| 2020/0192971 A1* | 6/2020 | Lue | G11C 16/0483 |
| 2021/0375353 A1* | 12/2021 | Liu | G11C 11/4074 |
| 2022/0398439 A1* | 12/2022 | Zhang | G11C 16/10 |

* cited by examiner (a)          (b)

NEUROMORPHIC DEVICE AND OPERATING METHOD OF THE SAME

CROSS-REFERENCE TO RELATED APPLICATION

Korean Patent Application No. 10-2020-0044024, filed on Apr. 10, 2020, in the Korean Intellectual Property Office, and entitled: "Neuromorphic Device and Operating Method of the Same," is incorporated by reference herein in its entirety.

BACKGROUND

1. Field

The present disclosure relates to a neuromorphic device, and more particularly, to a neuromorphic device including a three-dimensional synaptic array.

2. Description of the Related Art

There is increasing interest in neuromorphic processors resembling the human nervous system. There have been studies to realize the neuromorphic processors by designing neuron circuits and synaptic circuits that correspond to neurons and synapses existing in the human nervous system. Such a neuromorphic processor may be used to drive various neural networks such as a convolutional neural network (CNN), a recurrent neural network (RNN), and a feedforward neural network (FNN), and may be utilized in a field such as data classification or image recognition.

SUMMARY

Embodiments are directed to a neuromorphic device, including at least one synaptic array, wherein the synaptic array includes a plurality of input lines extending in a first direction and receiving input signals independently of each other from a plurality of axon circuits connected respectively thereto, a plurality of bit lines extending in a second direction orthogonal to the first direction and outputting output signals independently of each other, a plurality of cell strings, each including at least two resistive memristor elements and a string select transistor connected in series in a third direction between any one of the plurality of input lines and any one of the plurality of bit lines, a plurality of electrode pads stacked while being spaced apart from each other in the third direction between the plurality of input lines and the plurality of bit lines, and connected to the string select transistor and the at least two resistive memristor elements, a decoder configured to apply a string selection signal or a word line selection signal to each of the plurality of electrode pads and a plurality of neuron circuits, each being connected to one of the bit lines connected to one of the cell strings, summing the output signals, converting and outputting the summed signal when it is more than a predetermined threshold, wherein the synaptic array performs an artificial neural network computation on the input signals in the resistive memristor elements of a layer activated by the word line selection signal in at least one cell string to which the string selection signal is applied.

According to another embodiment of the present disclosure, a neuromorphic device includes an on-chip memory configured to read and store neuromorphic data, a neuromorphic processor including at least one synaptic array to perform an artificial neural network computation according to the neuromorphic data in the synaptic array, wherein the synaptic array includes a plurality of input lines respectively connected to a plurality of axon circuits to receive input signals based on the neuromorphic data, independently of each other, a plurality of bit lines spaced apart from the plurality of input lines, each bit line outputting an output current according to the artificial neural network computation, a plurality of neuron circuits respectively connected to the plurality of bit lines to sum the output currents and output the summed output current as an output signal when it is more than a predetermined threshold, a plurality of electrode pads stacked and arranged at predetermined intervals between the plurality of input lines and the plurality of bit lines, a plurality of memristor through-structures, each passing through the plurality of electrode pads to be connected between any one of the input lines and one of the bit lines to form a current path of the output current, a plurality of string select transistors respectively disposed between the plurality of memristor through-structures and the plurality of bit lines and a decoder connected to each of the plurality of electrode pads to apply a word line selection signal and a string selection signal.

According to other embodiment of the present disclosure, an operating method of a neuromorphic device including at least one three-dimensional synaptic array having a plurality of layers, the operating method comprises upon receiving a plurality of input signals independent of each other, performing an artificial neural network computation on the input signals in a plurality of resistive memristor elements of a layer corresponding to a word line selection signal, as a result of the artificial neural network computation, outputting a plurality of output currents to neuron circuits through bit lines, summing the output currents to output a summed output current as an output voltage when it is more than a predetermined threshold and wherein the three-dimensional synaptic array performs an artificial neural network computation independently for each layer activated by the word line selection signal.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

BRIEF DESCRIPTION OF THE DRAWINGS

Features will become apparent to those of skill in the art by describing in detail example embodiments with reference to the attached drawings in which.

DETAILED DESCRIPTION

Figure 1:
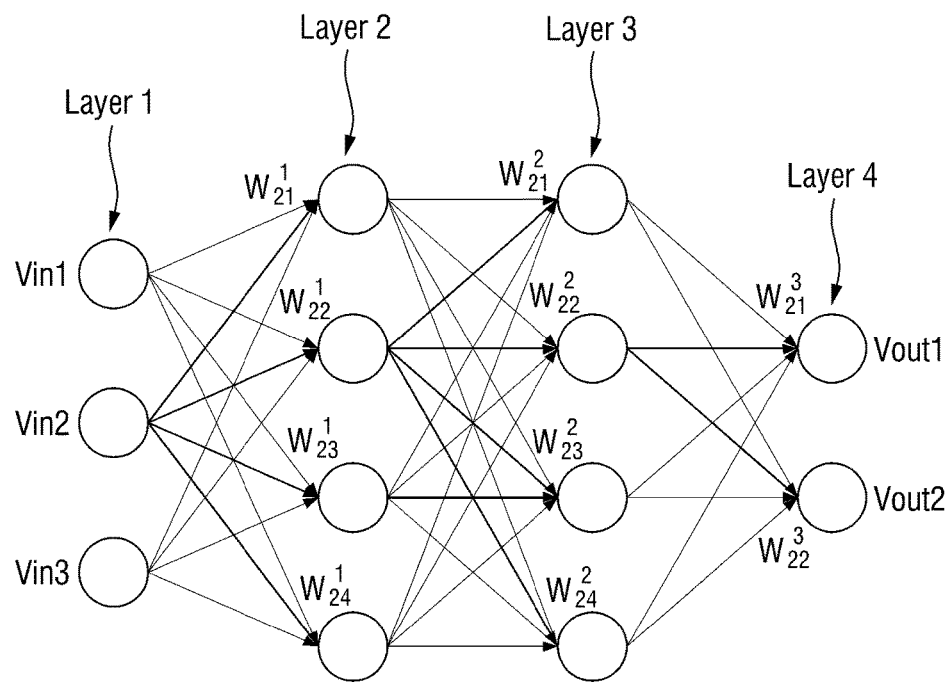
FIG. 1 shows a mathematical model for neuromorphic computation.
Figure 2:
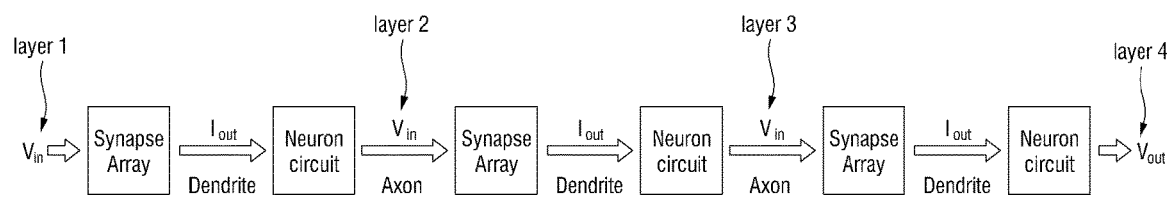
FIG. 2 is a conceptual diagram explaining neuromorphic computation.

FIG. 1 shows a mathematical model for neuromorphic computation. FIG. 2 is a conceptual diagram explaining neuromorphic computation.

A biological neuron is a cell present in the human nervous system. The biological neuron is one of basic biological computational entities. The human brain contains approximately 100 billion biological neurons and 100 trillion interconnections between the biological neurons.

The human brain can learn and remember a vast amount of information by transmitting and processing various signals through a neural network formed by connecting a large number of neurons to each other. The vast number of interconnections between neurons in the human brain correlates directly to the massively parallel nature of biological computing, and thus various attempts have been made to efficiently process a vast amount of information by simulating an artificial neural network. For example, as a computing system designed to implement the artificial neural network at a neuron level, a neuromorphic device is being studied.

The behavior of the biological neuron may be simulated by a mathematical model. The mathematical model corresponding to the biological neuron may include a multiplication operation of multiplying information from multiple neurons by synaptic weights, an addition operation (Σ) of values multiplied by synaptic weights, and an operation of applying a characteristic function (b) and an active function (f) to the addition operation result, as examples of neuromorphic operations.

Referring to FIG. 1, an example of an artificial neural network is illustrated, which includes an input layer, hidden layers, and an output layer. The artificial neural network may perform an operation based on received input data (e.g., Vin1, Vin2, Vin3), and generate output data (e.g., Vout1, Vout2) based on the operation result.

The artificial neural network may be a deep neural network (DNN) including two or more hidden layers or an n-layer neural network. For example, as illustrated in FIG. 1, the artificial neural network may be the DNN including an input layer Layer 1, two hidden layers Layer 2 and Layer 3, and an output layer Layer 4. The DNN may include CNN, RNN, FNN, deep belief networks, or restricted Boltzmann machines, etc.

The artificial neural network of FIG. 1 is illustrated as including four layers, but this is merely an example, and the artificial neural network may include fewer or more layers. Further, the artificial neural network may include layers having various structures different from that shown in FIG. 1.

Each of the layers included in the artificial neural network may include a plurality of artificial neurons. The artificial neuron may be referred to a "neuron", a "processing element (PE)", a "unit", or a similar term.

As illustrated in FIG. 1, Layer 1 may include three neurons and Layer 2 may include four neurons. However, this is merely an example and each of the layers included in the artificial neural network may include various numbers of neurons.

In FIG. 1, the neurons included in each of the layers in the artificial neural network may be connected to each other to exchange data. For example, one neuron may receive data from other neurons of the previous layer and compute it to output the computation result to other neurons of the next layer.

An output value of each of the neurons may be referred to as an activation. The activation may be an output value from one neuron, and may be an input value to neurons included in the next layer. Each of the neurons may determine its own activation value based on weights and activations received from the neurons included in the previous layer. The weight is a parameter used to calculate the activation in each neuron, and may be a value assigned to a connection relationship between neurons. The weight may be stored in a synapse that connects neurons.

Each of the neurons may be a computational unit that receives an input and outputs an activation, and may map the input and the output. For example, when σ is an activation function, $W_{jk}^i$ is a weight from the $k^{th}$ neuron included in the layer to the $j^{th}$ neuron included in the $i^{th}$ layer, $b_j^i$ is a bias of the $j^{th}$ neuron included in the $i^{th}$ layer, and $a_j^i$ is an activation of the $j^{th}$ neuron in the $i^{th}$ layer, the activation $a_j^i$ may follow Eq. 1:

$$a_j^i = \sigma(\Sigma_k(W_{jk}^i \times a_k^{i-1}) + b_j^i) \qquad \text{Eq. 1}$$

As such, the operation of the artificial neural network may include a multiplication operation that multiplies an output value of the neuron of the previous layer by a weight of the synapse, and an addition operation that adds the results of each multiplication in a reception neuron.

Figure 3:
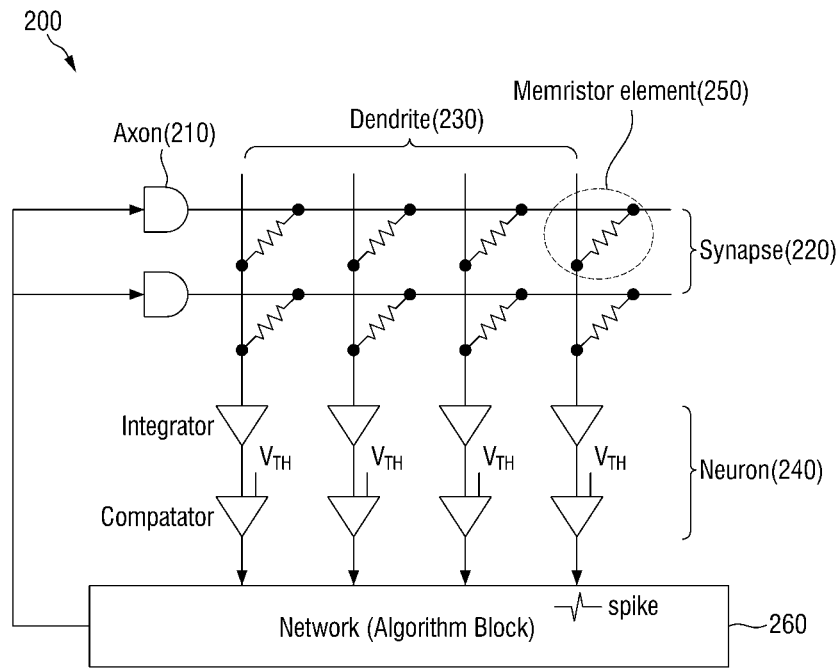
FIGS. 3 to 5 are diagrams explaining the configuration of a synaptic array circuit in a neuromorphic device according to some example embodiments.
Figure 4:
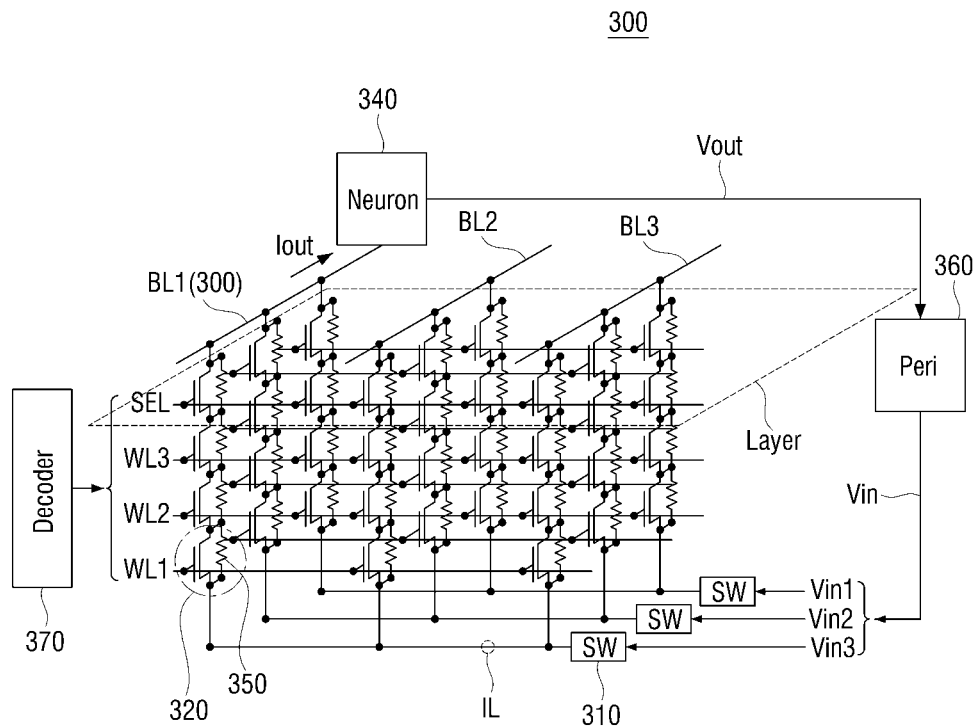
Figure 5:
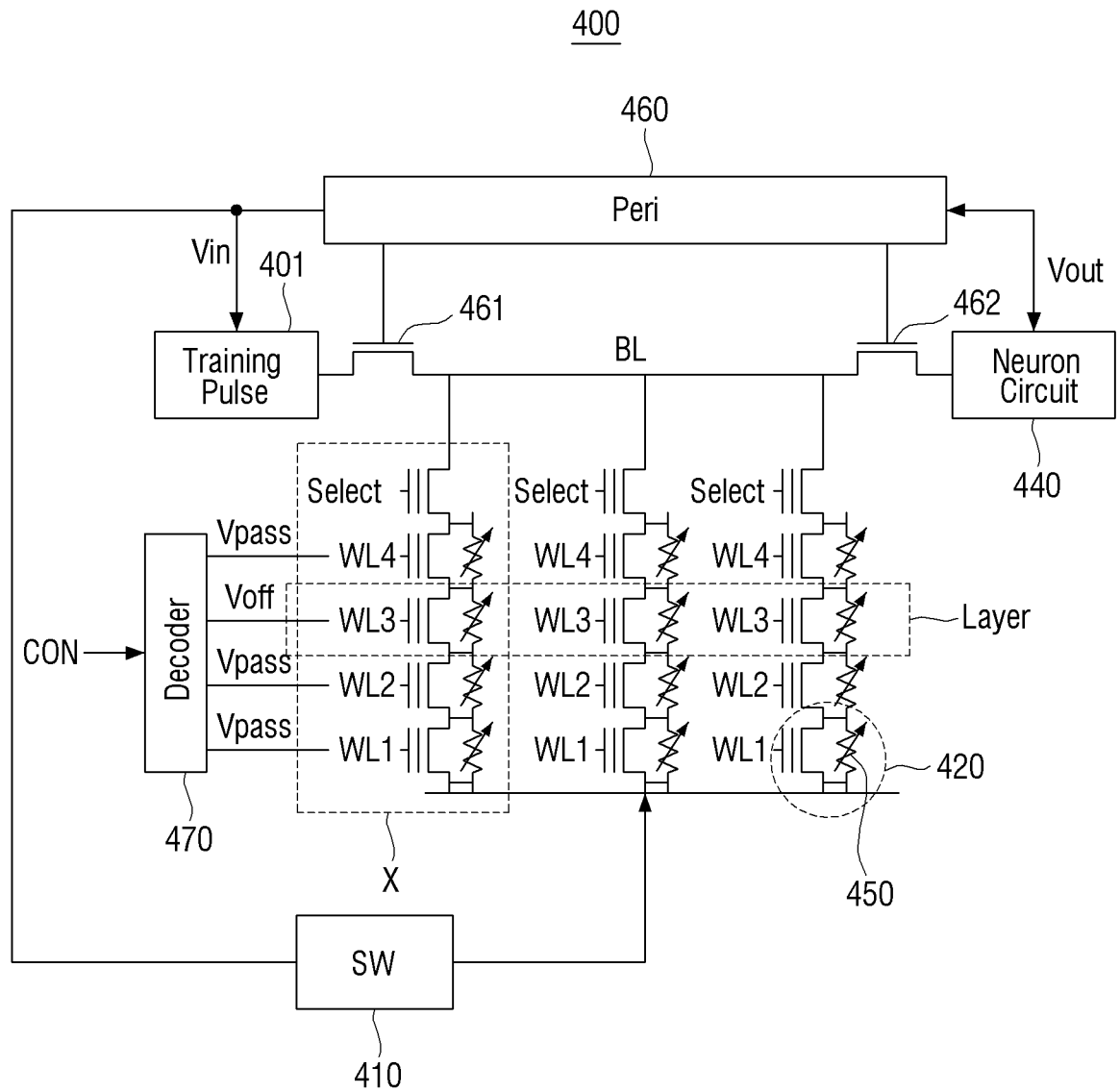

FIGS. 3 to 5 are diagrams explaining the configuration of a synaptic array circuit in a neuromorphic device according to some example embodiments.

Referring to FIG. 3, the configuration of an array circuit in a neuromorphic device 200 is illustrated two-dimensionally. The neuromorphic device 200 according to the present example embodiment includes axon circuits 210, synaptic circuits 220, dendrite circuits 230, neuron circuits 240, and a network 260. The neuromorphic device 200 may include first-direction lines (or axon lines) extending in a first direction from the axon circuits 210 and second-direction lines (or dendrite lines) extending in a second direction and corresponding to the dendrite circuits 230. The first direction lines and the second direction lines intersect each other, and the synaptic circuits 220 may be disposed on intersections of the first-direction lines and the second-direction lines. In FIG. 3, the first direction is illustrated as a row direction and the second direction is illustrated as a column direction, but this is merely an example.

Each of the axon circuits 210 may be a circuit that simulates the axon of the biological neuron. Since the neuron's axon performs a function of transmitting signals from a neuron to another neuron, each of the axon circuits 210 simulating the axon of the neuron may receive an activation and transmit it to the first-direction lines. The activation corresponds to a neurotransmitter transmitted through a neuron, and may be an electrical signal input to each of the axon circuits 210. In addition, each of the axon circuits 210 may include a memory or a register for storing input information.

Each of the synaptic circuits 220 may be a circuit that simulates a synapse between neurons. The synaptic circuits 220 may store weights corresponding to the connection strengths between neurons. Each of the synaptic circuits 220 may include a memory element for storing the weight or may be connected to a memory element already having the weight. In an example embodiment, such a memory element may be or include a memristor.

The dendrite circuits 230 may be circuits that simulate neurons' dendrites. The dendrite circuits 230 may receive signals from other external neurons, and provide computation results of weights and activations to each of the neuron circuits 240 through the second-direction line. Each of the neuron circuits 240 may determine whether to output a spike based on the computation results received through a corresponding second-direction line. For example, each of the neuron circuits 240 may output a spike when an accumulated value of the received computation results is greater than or equal to a predetermined threshold. The spikes output from the neuron circuits 240 may correspond to activations input to axons of the next stage through the network 260.

The neuron circuits 240 may be located at a rear end with respect to the synaptic circuits 220, and thus may be referred to as post-synaptic neuron circuits. The axon circuits 210 may be located at a front end with respect to the synaptic circuits 220, and thus may be referred to as pre-synaptic neuron circuits.

Each of the synaptic circuits 220 may be implemented with a memory element such as the memristor element 250. The memristor element 250 may store weights therein through a memristor-based design and perform multiplication (i.e., an AND operation) at the intersection. The memristor element 250 of each of the synaptic circuits 220 according to the present example embodiment may be implemented as a resistive element such as a phase change random access memory (PRAM) using a phase change material or a resistive random access memory (RRAM) using a variable resistance material such as a complex metal oxide. Materials constituting the resistive elements have a variable resistance value that varies depending on the magnitude and/or direction of the current or voltage, and have a nonvolatile characteristic that maintains its resistance as it is even when the current or voltage is cut off.

Referring to FIG. 4, a synaptic array according to some example embodiments may include a plurality of input lines IL, a plurality of bit lines BL, and a plurality of cell strings disposed between each input line and each bit line. For simplicity of description, the synaptic array is described as including three bit lines and three input lines, but may include a larger number of bit lines and input lines according to various embodiments.

The input line IL and the bit line BL of the synaptic array may be orthogonal to each other while being spaced apart from each other in a Z direction. For example, the input line IL may extend in an X direction, and the bit line may extend in a Y direction. The input line IL may be connected to the axon circuit, and the bit line BL may be connected to the dendrite circuit.

The plurality of cell strings may be connected to each of the bit lines BL1 to BL3 in parallel. The plurality of cell strings may be connected to input lines IL1 to IL3, which are independent of each other. Thus, each of the plurality of cell strings may be connected to one input line (e.g., IL1) and one bit line (e.g., BL1).

Each of the plurality of input lines IL1 to IL3 may extend in the X direction while being spaced apart in the Y direction in parallel to each other. Input signals may be independently applied to each of the input lines IL1 to IL3. According to some example embodiments, the axon circuit 210 may be implemented as an input switch (SW) 310 and connected to an input terminal of each input line IL1~IL3 to apply an input signal Vin1~Vin3. According to some example embodiments, the axon circuit 210 may be implemented as a memory or a register to store an input signal Vin1~Vin3 and output the same.

Each of the cell strings may include a string select transistor connected to the bit line BL, a plurality of memristor elements 320 connected in series between the input line IL and the string select transistor, and the input line IL. Each of the memristor elements 320 may include a word line transistor and a weight storage element. One cell string may be stacked vertically to reduce overhead by sharing and using one neuron circuit. The cell string will be described in further detail with reference to FIGS. 6A to 6D.

In some example embodiments, the synaptic array may operate on a layer basis. The neuromorphic device may learn by performing an artificial neural network computation independently for each layer.

One layer may include memristor elements disposed on the same plane and activated along one word line WL in the synaptic array. Each layer may include a different number of memristor elements as described with reference to FIG. 1. The number of memristor elements included in one layer may vary under the control of a decoder 370 and a peripheral circuit 360. For example, a first layer may include 3×3 memristor elements, and a second layer may include 2×3 memristor elements.

Each of the bit lines BL1 to BL3 may output an output signal Iout to the neuron circuits 340. According to some example embodiments, one neuron circuit 340 may be connected to one bit line BL.

The neuron circuit 340 may convert the output signal Iout from a current value into a voltage value Vout and transmit it to the peripheral circuit 360.

The decoder 370 may activate at least one word line among a plurality of word lines in response to word line selection signals WL1 to WL3 and a string selection signal SEL to activate a memristor element of a specific address. In this case, a pass voltage Vpass or an off voltage Voff may be applied to the word line.

Describing the operation in more detail with reference to FIG. 5, a peripheral circuit 460 may include at least two transistors 461 and 462. The first and second transistors 461 and 462 may be connected between the peripheral circuit 460 and the bit line BL. The first transistor 461 may be connected to the input terminal side of the synaptic array, and the second transistor 462 may be connected to the output terminal side of the synaptic array.

In an example embodiment, the peripheral circuit 460 first outputs an input signal Vin to an axon circuit 410. When the input signal Vin is applied, a training pulse generation circuit 401 generates a training pulse based on a control signal as to whether to perform learning. The first transistor 461 is connected between the training pulse generation circuit 401 and the bit line BL, and outputs a training pulse to the bit line under the control of the peripheral circuit 460.

When at least one string X is selected in response to the string selection signal SEL, the off voltage Voff may be applied to at least one word line selected through the decoder 470 in response to a control signal CON and the pass voltage Vpass may be applied to the remaining unselected word lines.

For example, when the word line WL3 is selected, the off voltage Voff is applied to the transistor of the word line WL3, and the pass voltage Vpass is applied to the word lines WL1, WL2, and WL4. The synaptic array performs an artificial neural network computation on a layer corresponding to the word line WL3. For example, a memristor element 450 of the word line WL3 may multiply the input signal Vin by a weight to output the multiplication result as an output signal Iout.

In the bit line BL, the output signal Iout output from each string may be summed. When receiving the summed output signal Itot, the second transistor 462 outputs the summed output signal Itot to the neuron circuit 440 when it is turned on under the control of the peripheral circuit 460. When the summed output signal Itot exceeds a predetermined threshold, the neuron circuit 440 may convert the summed output signal Itot into an output voltage Vout and output it to the peripheral circuit 460.

FIGS. 6A to 6D are diagrams illustrating one string of the synaptic array according to some example embodiments.

Figure 6A:
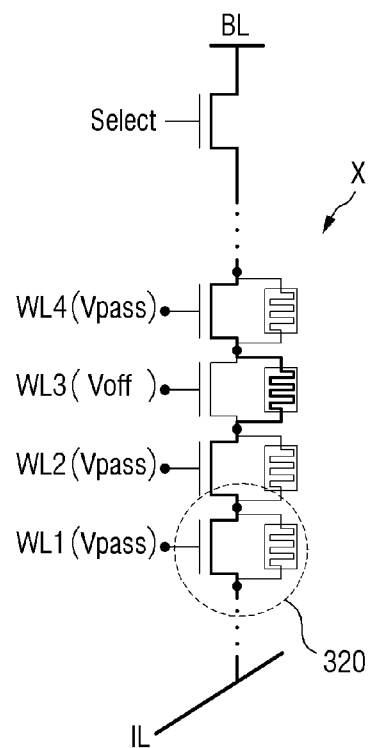
FIGS. 6A to 6D are diagrams illustrating one string of the synaptic array according to some example embodiments.

Referring to FIG. 6A, one cell string X may include at least two memristor elements 320 connected in series. The cell string X may include a string select transistor between the bit line BL and the input line IL. The memristor element may include one word line select transistor and a resistive memory cell. The memristor elements respectively corresponding to the word lines in the cell string X may be included in different layers from each other.

Figure 6B:
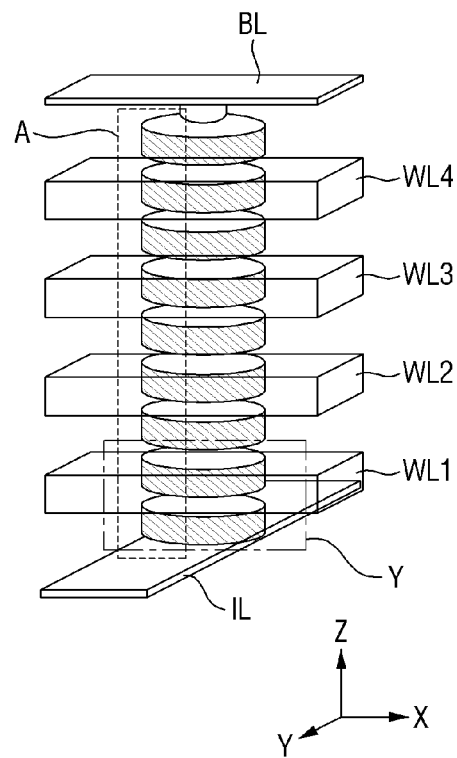

Referring to FIG. 6B, electrode pads extending in a plane along the X-Y direction may be stacked between the bit line BL and the input line IL which cross each other orthogonally while being spaced apart in the Z direction.

The electrode pads are stacked at a predetermined interval in the Z direction, and may include an inter-electrode insulating film (ILD) between the electrode pads for the word lines WL1~WL4. The inter-electrode insulating film may include, for example, silicon oxide, etc. Each electrode pad may include the word line WL1~WL3 of memory cells. Further, although not illustrated, each electrode pad may include an output terminal of the axon circuit and a gate electrode included in the string select transistor described with reference to FIGS. 4 to 6A.

The memristor elements connected in series may be formed as a memristor through-structure. The memristor through-structure has a pillar shape extending long along the Z axis, and is disposed to connect one bit line BL to one input line IL through the stacked electrode pads.

Figure 6C:
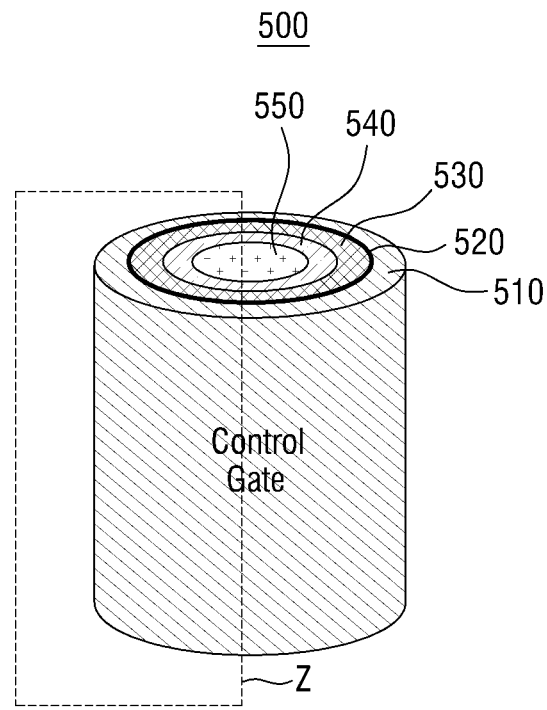
Figure 6D:
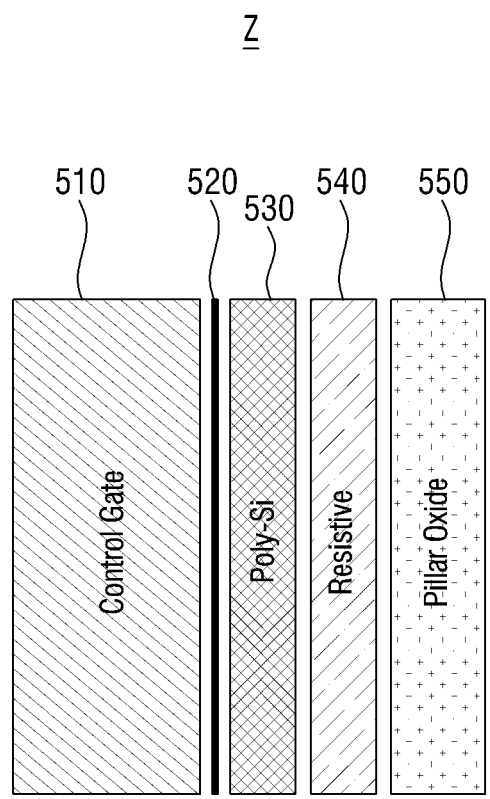

Referring to FIGS. 6C and 6D, a memristor element Y (see FIG. 6B) may include a control gate electrode 510, a gate insulating film 520, a polysilicon oxide 530, a resistive material or a phase-change material 540, and a pillar oxide 550.

The memristor element Y may be in the form of a pillar, having the pillar oxide 550 at its center and surrounded by layers in the order of the resistive material 540, the polysilicon oxide 530, the gate insulating film 520, and the control gate electrode 510.

In FIGS. 6B to 6D, the control gate electrode 510 may be the electrode pad. The control gate electrode 510 may be made of platinum (Pt), ruthenium (Ru), iridium (Ir), silver (Ag), aluminum (Al), titanium (Ti), tantalum (Ta), tungsten (W), silicon (Si), copper (Cu), nickel (Ni), cobalt (Co), a conductive nitride thereof (e.g., TiN), or a combination thereof (e.g., Ti/TiN). In an example embodiment, the control gate electrode 510 may be made of TiN, which is well compatible with a Si CMOS-based process.

According to some example embodiments, the memristor elements Y may include at least one of materials having characteristics (i.e., variable resistance characteristics) in which the resistance of the memristor element can be selectively changed by a current passing through the memristor element. According to some example embodiments, the resistive material 540 may be a transition metal oxide film, e.g., any one of $TiO_2$, NiO, $HfO_2$, $Al_2O_3$, $ZrO_2$, and ZnO layers, or a combination thereof. In another implementation, the resistive material 540 may be formed of a material, such as a chalcogen-based compound or a perovskite-based compound, capable of variable switching of resistance. A material having a large ratio between a resistance value in a low resistance state and a resistance value in a high resistance state and having a small driving voltage for reducing power consumption may be used.

In the drawing, the resistive material 540 and the control gate electrode 510 are each illustrated as a single layer, but each may have a multilayer structure including a barrier film suitable for other embodiments.

Figure 7:
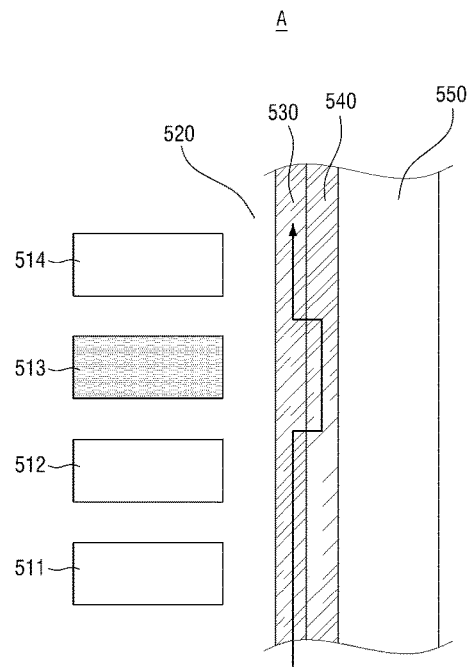
FIG. 7 is a diagram describing an operation when one layer is selected in the synaptic array according to some example embodiments.

FIG. 7 is a diagram describing an operation when one layer is selected in the synaptic array according to some example embodiments.

Referring to FIG. 7 and 'A' of FIG. 6B, a current path is formed from the input line IL to the bit line BL. When the off voltage Voff is applied to any one of electrode pads 511 to 514 (e.g., electrode pad 513) and the pass voltage Vpass is applied to the remaining electrode pads 511, 512, and 514, the current may flow through a channel layer, i.e., the polysilicon oxide 530, and detour to the resistive material 540 in a layer corresponding to the electrode pad 513 due to the off voltage Voff, and then flow back to the polysilicon oxide 530 at the next electrode pad 514.

When the current flows through the resistive material 540 for a selected word line, a resistance value varies depending on the degree of current passing through the resistive material 540. Then, an output current Iout may be determined from the varied resistance value in comparison with an input voltage Vin. In the cell string, resistive memory elements are connected in series, and based on the linear characteristic of the current with respect to the resistance component, the output current Iout may be summed in the neuron circuit.

Figure 8:
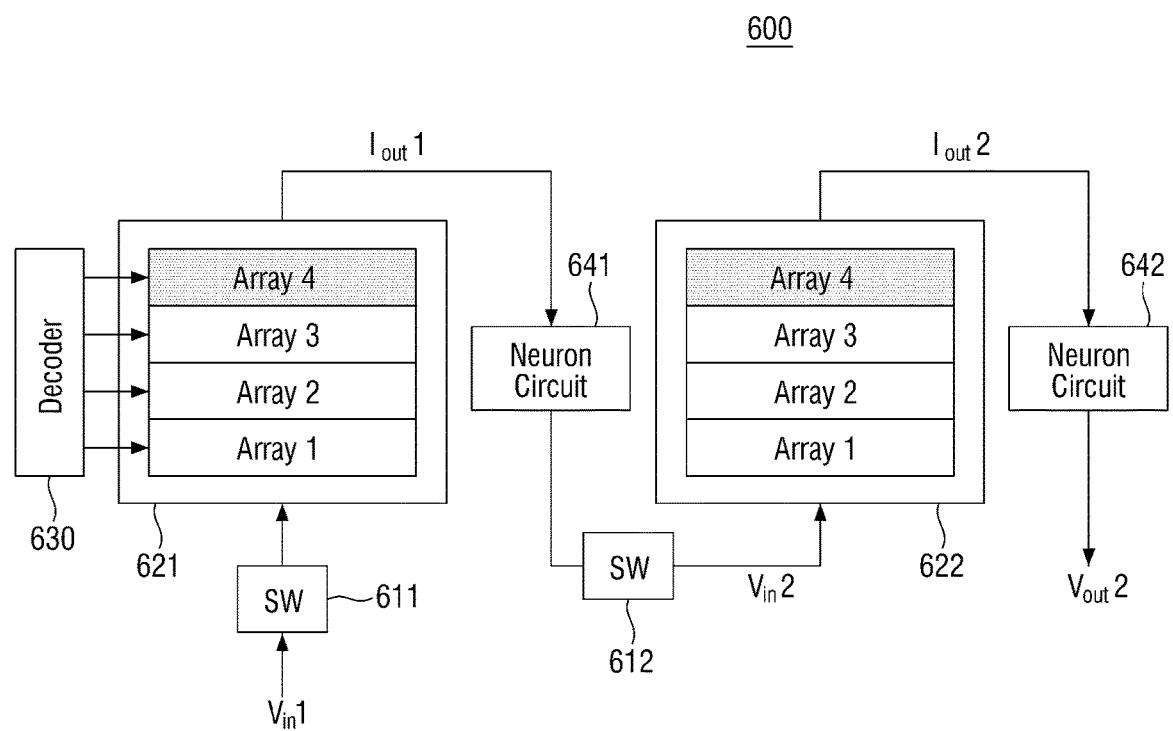
FIGS. 8 and 9 are conceptual diagrams describing an operation of a neuromorphic device according to some example embodiments.
Figure 9:
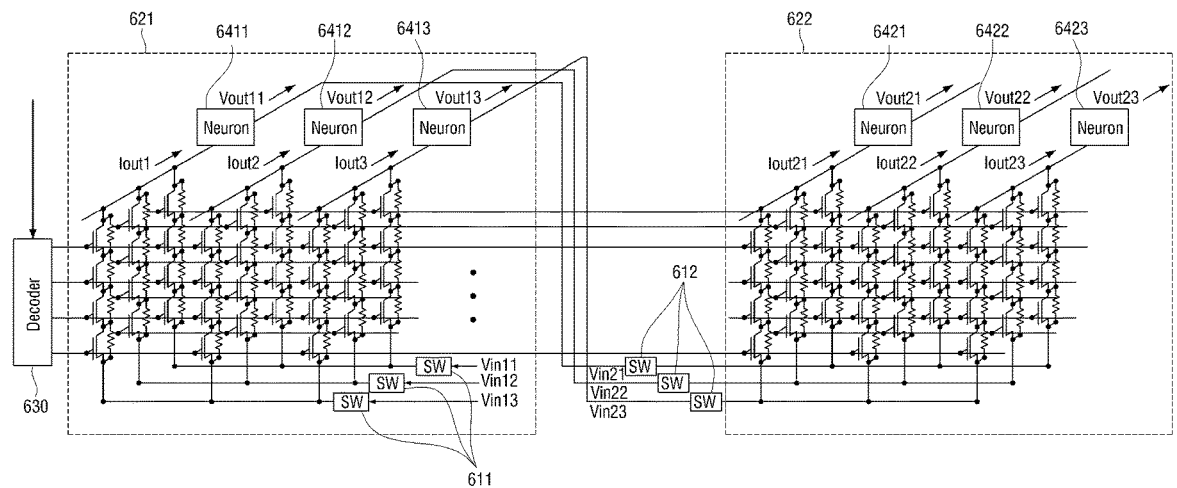

FIGS. 8 and 9 are conceptual diagrams describing an operation of a neuromorphic device according to some example embodiments.

In FIGS. 8 and 9, a neuromorphic device 600 may include at least two synaptic arrays, e.g., synaptic arrays 621 and 622. The at least two synaptic arrays 621 and 622 each may include an axon circuit 611, 612 and a neuron circuit 641, 642 which may be connected in series to each other between the synaptic arrays 621 and 622.

Each layer of the synaptic array 621, 622 may perform an artificial neural network computation independently of each other. According to some example embodiments, a first layer corresponding to the word line WL1 of the synaptic array 621, 622 may perform artificial neural network computation for face recognition, a second layer corresponding to the word line WL2 may perform artificial neural network computation for cryptography, a third layer corresponding to the word line WL3 may perform artificial neural network computation for trend inference, and a fourth layer corresponding to the word line WL4 may perform artificial neural network computation for pattern recognition.

In FIG. 9, the first synaptic array 621 and the second synaptic array 622 are implemented as a 4×4 array according to some example embodiments, but may be implemented as an array of at least 2×2 according to various example embodiments.

A decoder 630 may be connected to the first synaptic array 621 and the second synaptic array 622 to select one synaptic array and apply a string selection signal and a word line voltage of the selected synaptic array.

When an input signal Vin1 (i.e., Vin11, Vin12, Vin13) is input to the first synaptic array 621 through the first axon circuit 611, the decoder 630 may select one layer (shown as Array 4 in the drawing) in response to the input signal Vin1 to perform the artificial neural network computation. As a result of the artificial neural network computation, an output signal Iout1 (i.e., Iout11, Iout12, Iout13) is output from the first synaptic array 621. Then, the output signal is converted into an input signal Vin2 (i.e., Vin21, Vin22, Vin23) by a first neuron circuit 641 (i.e., 6411, 6412, 6413). The input signal Vin2 may be output when the dendrite, i.e., the output signal Iout1, Iout2, Iout3 summed in the bit line, exceeds a predetermined threshold.

The input signal Vin2 is input to the second synaptic array 622 through the second axon circuit 612, and the decoder 630 may select one layer (shown as Array 4 in the drawing) in response to the input signal Vin2 to perform the artificial neural network computation. As a result of the artificial neural network computation, an output signal Iout2 (i.e., Iout21, Iout22, Iout23) is output from the second synaptic array 622. Then, the output signal Iout2 is converted into an output signal Vout2 (i.e., Vout21, Vout22, Vout23) by the second neuron circuit 642 (i.e., 6421, 6422, 6423). The output signal Vout2 may be output when the dendrite, i.e., the output signal Iout21, Iout22, Iout23 summed in the bit line, exceeds a predetermined threshold.

According to some example embodiments, the neuromorphic device 600 may perform the artificial neural network computation by activating the same layer of a plurality of synaptic arrays. Thus, by activating Array 4 of the first synaptic array 621 and Array 4 of the second synaptic array 622 through the decoder 630, the artificial neural network computation may be performed to output an output signal. In this case, Array 4 of the first synaptic array 621 and Array 4 of the second synaptic array 622 may have the same N×M array (N and M are natural numbers of 2 or more).

Array 1 to Array 4 of the first and second synaptic arrays 621 and 622 may have sizes that are independent of each other for the artificial neural network computation. The size of the array in each layer may be 3×3 for Array 1, 2×3 for Array 2, 4×4 for Array 3, and 2×2 for Array 4, according to some example embodiments.

Figure 10:
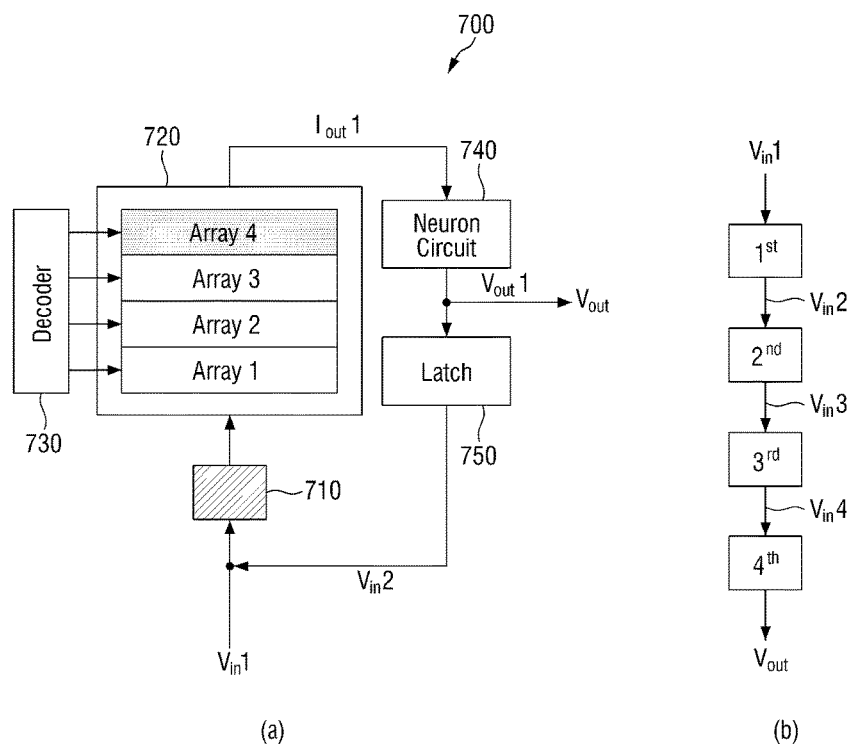
FIGS. 10(a), 10(b), and 11 are conceptual diagrams describing an operation of a neuromorphic device according to some example embodiments.
Figure 11:
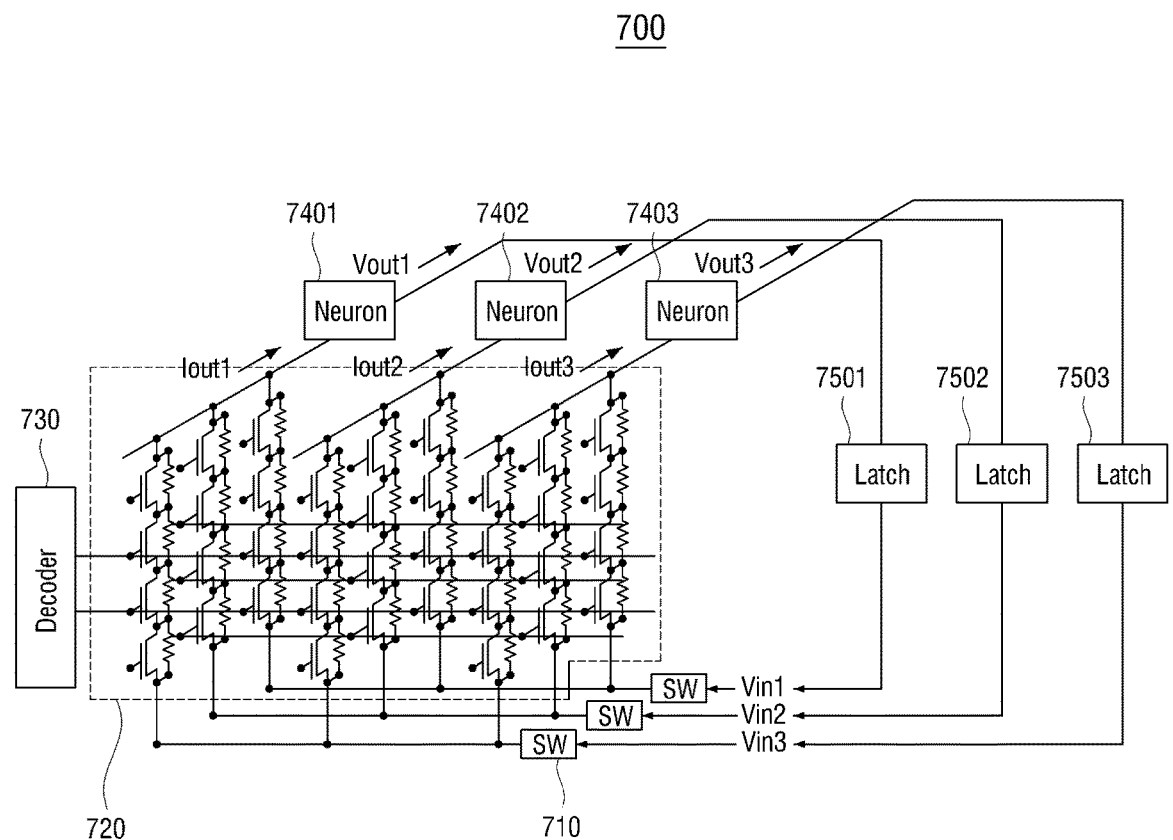

FIGS. 10(a), 10(b), and 11 are conceptual diagrams describing an operation of a neuromorphic device according to some example embodiments.

Referring to FIGS. 10(a), 10(b), and 11, a neuromorphic device 700 according to some example embodiments may include an axon circuit 710, one synaptic array 720, a decoder 730, a neuron circuit 740, and a latch circuit 750.

Unlike the embodiment of FIGS. 8 and 9, the neuromorphic device 700 may perform the artificial neural network computation using the one synaptic array 720, as illustrated in FIG. 10(b). In this case, a computation result of the previous layer is stored in the latch circuit 750, and when learning of the next artificial neural network is required, the value stored in the latch circuit 750 may be input to the synaptic array 720 and the next artificial neural network computation may be performed.

Each layer of the synaptic array 720 may perform the artificial neural network computation in a manner of being associated with each other. According to some example embodiments, in the case of artificial neural network computation for face recognition, the first layer (corresponding to the word line WL1 of the synaptic array 621, 622) to the fourth layer (corresponding to the word line WL4) may learn by receiving the value stored in the latch circuit 750 to perform artificial neural network computation for face recognition. In this case, a read disturb phenomenon may be minimized by performing the artificial neural network computation in different layers in one synaptic array, and when there are multiple synaptic arrays, connection freedom for connecting arrays to each other may be improved.

In FIG. 10(a) and FIG. 10(b), in the neuromorphic device 700, the input signal Vin1 may be input to the synaptic array 720 through the axon circuit 710, and the decoder 730 may select one layer (e.g., a layer corresponding to WL1) in response to the input signal Vin1 to perform the artificial neural network computation. As a result of the artificial neural network computation, the output signal Iout1 is output from the synaptic array 720. Then, the neuron circuit 740 may convert the output signal from the current Iout1 into a voltage Vout1 to output the converted signal. The converted output signal Vout1 is stored in the latch circuit 750 and then called at a next artificial neural network computation ($2^{nd}$) to be input to a layer corresponding to WL2 as an input signal Vin2. Similarly, a third artificial neural network computation ($3^{rd}$) and a fourth artificial neural network computation ($4^{th}$) may also receive previous computation results (Vin3 and Vin4), store them in the latch circuit 750 (i.e., 7501, 7502, 7503), and sequentially input them to different layers (e.g., as shown in the drawing, a layer corresponding to WL3 and a layer corresponding to WL4) to output an output signal Vout through the neuron circuit 740 (i.e., 7401, 7402, 7403).

Figure 12:
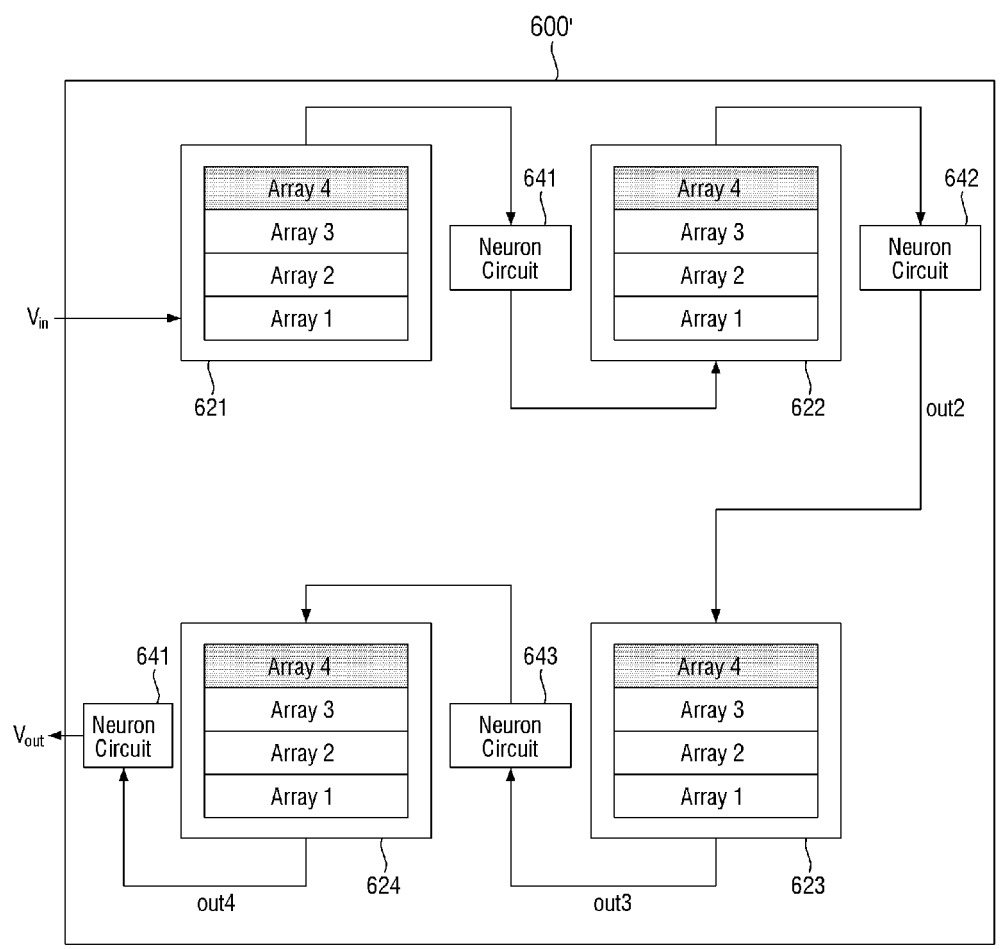
FIGS. 12 and 13 are conceptual diagrams describing operation of each layer in the synaptic array according to some example embodiments.
Figure 13:
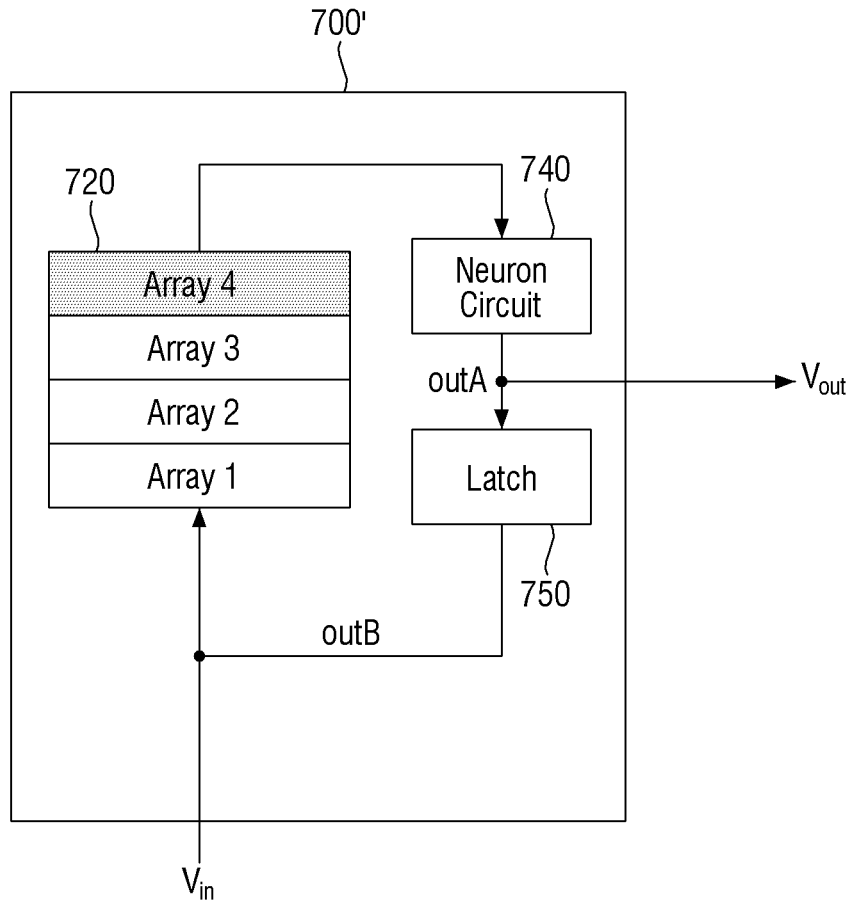

FIGS. 12 and 13 are conceptual diagrams describing operation of each layer in the synaptic array according to some example embodiments. It is assumed that artificial neural network learning is performed four times according to some example embodiments.

In FIG. 12, according to some example embodiments, when a neuromorphic device 600' includes a plurality of synaptic arrays, the synaptic arrays may perform the artificial neural network computation independently for each layer corresponding to each word line. For the artificial neural network learning of four times, 4 synaptic arrays may be connected in series and sequentially activated to sequentially perform the first to fourth artificial neural network computations in a layer (shown as using Array 4 in the drawing) for the same word line and output an output signal Vout.

In FIG. 13, according to some example embodiments, when the neuromorphic device 700' includes one synaptic array, all layers of the synaptic array may perform the same artificial neural network computation. For the artificial neural network learning of four times, the synaptic array may sequentially activate each layer to perform the first artificial neural network computation in the first layer (Array 1), the second artificial neural network computation in the second layer (Array 2), the third artificial neural network computation in the third layer (Array 3), and the fourth artificial neural network computation in the fourth layer (Array 4) and output an output signal Vout.

Figure 14:
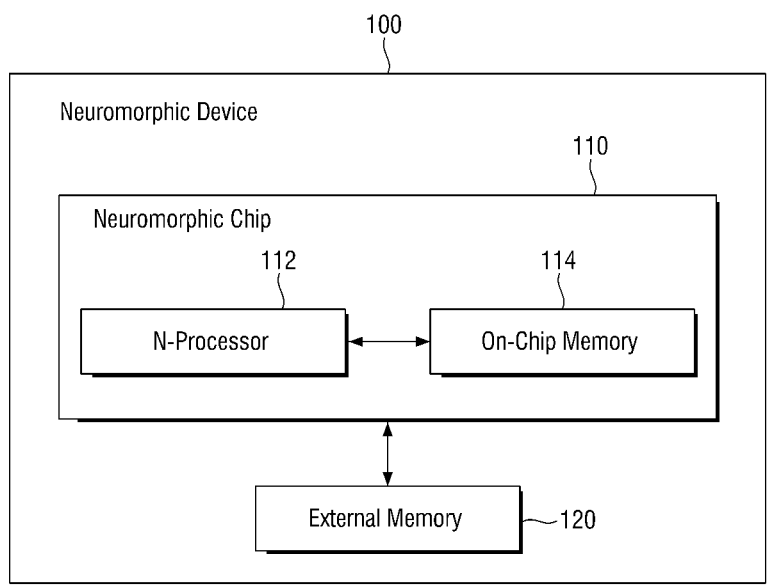
FIG. 14 is a block diagram illustrating a hardware configuration of a neuromorphic device according to an example embodiment.

FIG. 14 is a block diagram illustrating a hardware configuration of a neuromorphic device according to an example embodiment.

Referring to FIG. 14, a neuromorphic device 100 according to the present example embodiment includes a neuromorphic chip 110 having a neuromorphic processor (N-processor) 112 and an on-chip memory 114, and an external memory 120. In should be noted that, in the neuromorphic device 100 shown in FIG. 14, only some components related to the present example embodiment are illustrated and, in addition to the components shown in FIG. 14, other general-purpose components, e.g., a central processing unit (CPU), a graphic processing unit (GPU), an application processor (AP), a sensor module, a communication module, and the like may be further included in the neuromorphic device 100.

The neuromorphic device 100 may be included in various types of electronic devices such as a personal computer (PC), a server device, a mobile device, and an embedded device. The neuromorphic device 100 may correspond to a hardware component included in, e.g., a smart phone, a tablet device, an augmented reality (AR) device, an Internet of Things (IoT) device, and autonomous vehicles, robotics, medical devices, and the like that perform, e.g., voice recognition, image recognition, and image classification using a neural network. Thus, the neuromorphic device 100 may correspond to a dedicated hardware accelerator mounted on the above electronic devices, or correspond to a hardware accelerator, such as a neural processing unit (NPU), a tensor processing unit (TPU), or a neural engine (which is a dedicated module for driving a neural network), etc.

The neuromorphic chip 110 may serve to control overall functions for driving the neural network in the neuromorphic device 100. For example, the neuromorphic processor 112 of the neuromorphic chip 110 may access neuromorphic data (e.g., axon values, synapse values, etc.) stored in the external memory 120 in the neuromorphic device 100 to execute neuromorphic-related programs, thereby generally controlling the neuromorphic device 100. The neuromorphic processor 112 may include the synaptic array according to some example embodiments illustrated in FIGS. 1 to 13. The neuromorphic chip 110 may drive a neural network under the control of a CPU, a GPU, an AP, or the like, which may be provided inside or outside the neuromorphic device 100.

The external memory 120 may be hardware that stores various neuromorphic data processed in the neuromorphic chip 110. The external memory 120 may store therein data that has been processed in the neuromorphic chip 110 and data that is to be processed in the neuromorphic chip 110. Further, the external memory 120 may store therein applications, drivers, and the like to be run by the neuromorphic chip 110. The external memory 120 may include a random access memory (RAM) such as a dynamic random access memory (DRAM) and a static random access memory (SRAM), a read-only memory (ROM), an electrically erasable programmable read-only memory (EEPROM), a CD-ROM, Blu-ray or another optical disk storage, a hard disk drive (HDD), a solid state drive (SSD), or a flash memory.

The on-chip memory 114 of the neuromorphic chip 110 may read and store (or buffer) neuromorphic data (e.g., axon values, synaptic values) for pre-synaptic neuron circuits from the external memory 120, and may execute the neural network, i.e., perform the artificial neural network computation using the stored neuromorphic data. Further, the on-chip memory 114 may store data for post-synaptic neuron circuits, such as neuron values and spike values generated as a result of the execution of the neural network.

Figure 15:
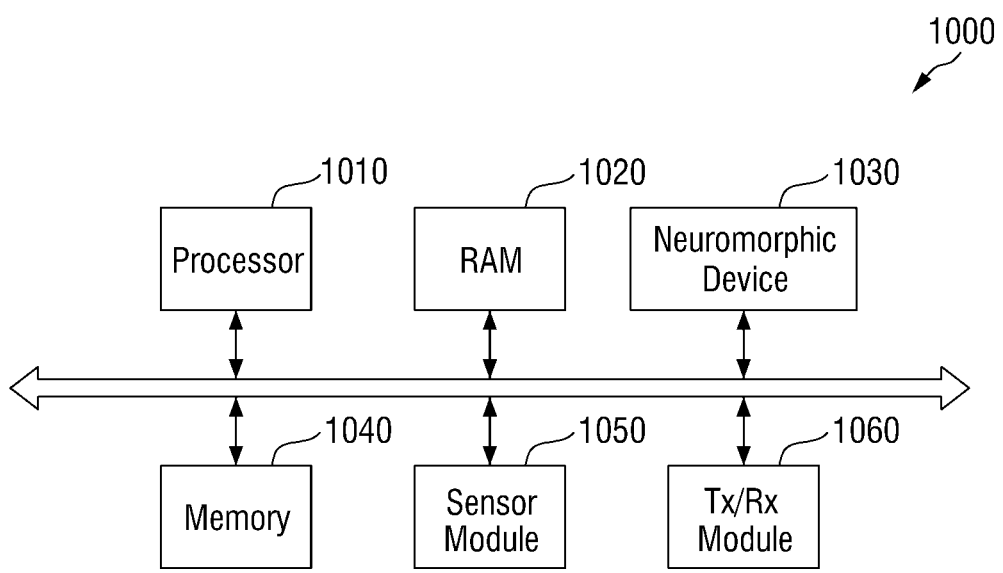
FIG. 15 is a block diagram illustrating a configuration of an electronic system according to some example embodiments.

FIG. 15 is a block diagram illustrating a configuration of an electronic system according to some example embodiments.

Referring to FIG. 15, an electronic system 1000 may analyze input data in real time based on the neural network to extract valid information, and based on the extracted information, may determine a situation or control components of an electronic device on which the electronic system 1000 is mounted. For example, the electronic system 1000 may be applied to a robotic device such as a drone and an advanced driver assistance system (ADAS), a smart TV, a smartphone, a medical device, a mobile device, an image display device, a measurement device, and an IoT device, and the like. Further, the electronic system 1000 may be mounted on at least one of various other types of electronic devices.

The electronic system 1000 may include a processor 1010, a RAM 1020, a neuromorphic device 1030, a memory 1040, a sensor module 1050, and a communication module 1060. The electronic system 1000 may further include an input/output module, a security module, a power control device, and the like. Some of the hardware components of the electronic system 1000 may be mounted on at least one semiconductor chip.

The processor 1010 may control the overall operation of the electronic system 1000. The processor 1010 may include one processor core (single core) or a plurality of processor cores (multi-core). The processor 1010 may process or execute programs and/or data stored in the memory 1040. In some example embodiments, the processor 1010 may control the function of the neuromorphic device 1030 by executing the programs stored in the memory 1040. The processor 1010 may be implemented as a CPU, GPU, AP, or the like.

The RAM 1020 may temporarily store programs, data, or instructions. For example, programs and/or data stored in the memory 1040 may be temporarily stored in the RAM 1020 according to the control or boot code of the processor 1010. The RAM 1020 may be implemented as a dynamic RAM (DRAM), a static RAM (SRAM), or the like.

The neuromorphic device 1030 may perform a computation of the neural network based on received input data, and generate an information signal based on the computation result. The neural network may include, but is not limited to, CNN, RNN, FNN, deep belief networks, restricted Boltzmann machines, and the like. According to an example embodiment, the neuromorphic device 1030 is a hardware accelerator dedicated to the neural network or a device including the same, and may include the neuromorphic processor according to example embodiments described above.

The information signal may include one of various types of recognition signals such as a voice recognition signal, an object recognition signal, an image recognition signal, and a biometric information recognition signal. For example, the neuromorphic device 1030 may receive frame data included in a video stream as input data, and generate, from the frame data, a recognition signal for an object included in an image represented by the frame data. In other example embodiments, the neuromorphic device 1030 may receive various types of input data depending on the type or function of the electronic device on which the electronic system 1000 is mounted, and may generate a recognition signal according to the input data.

The memory 1040 is a storage location for storing data, and may store an operating system (OS), various programs, and various data. In an embodiment, the memory 1040 may store intermediate results generated during the computation process of the neuromorphic device 1030.

The memory 1040 may be a DRAM, etc. The memory 1040 may include at least one of a volatile memory or a nonvolatile memory. The nonvolatile memory includes a ROM, a programmable ROM (PROM), an erasable PROM (EPROM), an electrically erasable PROM (EEPROM), a flash memory, a phase-change random-access memory (PRAM), a magnetoresistive RAM (MRAM), a resistive RAM (RRAM), a ferroelectric RAM (FRAM), and the like. The volatile memory includes a DRAM, SRAM, SDRAM, PRAM, MRAM, RRAM, FeRAM, and the like. In an embodiment, the memory 1040 may include at least one of HDD, SSD, CF, SD, micro-SD, mini-SD, xD or memory stick.

The sensor module 1050 may collect peripheral information of the electronic device on which the electronic system 1000 is mounted. The sensor module 1050 may sense or receive a signal (e.g., a video signal, an audio signal, a magnetic signal, a bio-signal, a touch signal, etc.) from the outside of the electronic device, and convert the sensed or received signal into data. For example, the sensor module 1050 may include at least one of various types of sensing devices such as a microphone, an imaging device, an image sensor, a light detection and ranging (LIDAR) sensor, an ultrasonic sensor, an infrared sensor, a bio sensor, and a touch sensor.

The sensor module 1050 may provide the converted data to the neuromorphic device 1030 as input data. For example, the sensor module 1050 may include an image sensor, generate a video stream by photographing the external environment of the electronic device, and provide successive data frames of the video stream to the neuromorphic device 1030 in order as input data. In other example embodiments, the sensor module 1050 may provide various types of data to the neuromorphic device 1030.

The communication module 1060 may be provided with various wired or wireless interfaces capable of communicating with an external device. For example, the communication module 1060 may include a communication interface that can access a wired local area network (LAN), a wireless local area network (WLAN) such as wireless fidelity (Wi-Fi), a wireless personal area network (WPAN) such as Bluetooth, a wireless universal serial bus (wireless USB), Zigbee, near field communication (NFC), radio-frequency identification (RFID), power line communication (PLC), or a mobile cellular network such as 3rd generation (3G), 4th generation (4G), and long-term evolution (LTE).

By way of summation and review, a neuromorphic device may include a synaptic circuit that stores a connection strength between neurons, and the synaptic circuit may be implemented using a memory device including variable resistance elements that store one or more bits.

As described above, embodiments may provide a highly integrated high-power synaptic array. Embodiments may also provide a highly integrated high-power neuromorphic device. Embodiments may also provide an operating method of a highly integrated high-power neuromorphic device.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A neuromorphic device, comprising:
   at least one synaptic array,
   wherein the synaptic array includes:
   a plurality of input lines extending in a first direction and receiving input signals independently of each other from a plurality of axon circuits connected respectively thereto;
   a plurality of bit lines extending in a second direction orthogonal to the first direction and outputting output current signals independently of each other;
   a plurality of cell strings, each including at least two resistive memristor elements and a string select transistor connected in series in a third direction between any one of the plurality of input lines and any one of the plurality of bit lines;
   a plurality of electrode pads stacked while being spaced apart from each other in the third direction between the plurality of input lines and the plurality of bit lines, and connected to the string select transistor and the at least two resistive memristor elements;
   a decoder configured to apply a string selection signal or a word line selection signal to each of the plurality of electrode pads; and
   a plurality of neuron circuits, each being connected to one of the bit lines connected to one of the cell strings, summing the output current signals output by the plurality of bit lines, converting the summed output current signal to a summed output voltage signal, and outputting the summed output voltage signal when the summed output current signal is more than a predetermined threshold,
   wherein the synaptic array performs an artificial neural network computation on the input signals in the resistive memristor elements of a layer activated by the word line selection signal in at least one cell string to which the string selection signal is applied.

2. The neuromorphic device as claimed in claim 1, wherein each of the cell strings passes through the stacked electrode pads and is arranged in a pillar shape connecting a corresponding bit line of the plurality of bit lines and a corresponding input line of the plurality of input lines.

3. The neuromorphic device as claimed in claim 2, wherein each of the cell strings is formed in the pillar shape having a pillar oxide at its center and surrounded by layers in the order of a resistive material layer, a polysilicon oxide layer, and a gate insulating film.

4. The neuromorphic device as claimed in claim 3, wherein the synaptic array:
   activates a cell string of the plurality of cell strings by applying the string selection signal to an uppermost electrode pad among the plurality of electrode pads,
   activates a resistive memristor element in response to the word line selection signal in the activated cell string, and
   performs the artificial neural network computation by inputting an input signal of the input signals to the activated resistive memristor element to output an output of the output current signals to the corresponding bit line.

5. The neuromorphic device as claimed in claim 1,
wherein a first synaptic array and a second synaptic array are connected in series, and
wherein the first synaptic array and the second synaptic array are spaced apart in the first direction or the second direction, and share the plurality of electrode pads and the decoder.

6. The neuromorphic device as claimed in claim 5,
wherein a first artificial neural network computation is performed in a first layer of the first synaptic array in response to an input signal of the input signals, and a second artificial neural network computation is performed in a second layer of the second synaptic array in response to an intermediate signal output from the first synaptic array to generate an output current signal of the output current signals, and
wherein the first layer and the second layer are activated by a same word line selection signal.

7. The neuromorphic device as claimed in claim 6, wherein the second artificial neural network computation has a same weight as the first artificial neural network computation.

8. The neuromorphic device as claimed in claim 1, wherein the synaptic array includes a plurality of latch circuits respectively connected between the plurality of neuron circuits and the plurality of input lines to store the output current signals.

9. The neuromorphic device as claimed in claim 8, wherein the neuromorphic device performs a first artificial neural network computation in a first layer of the synaptic array in response to an input signal of the input signals and stores an intermediate signal output from a neuron circuit of the plurality of neuron circuits in a latch circuit of the plurality of latch circuits, and performs a second artificial neural network computation in a second layer of the synaptic array in response to the stored intermediate signal and outputs an output current signal of the output current signals from the neuron circuit.

10. The neuromorphic device as claimed in claim 9, wherein the first layer and the second layer are activated by different word line selection signals.

11. A neuromorphic device, comprising:
an on-chip memory configured to read and store neuromorphic data;
a neuromorphic processor including at least one synaptic array to perform an artificial neural network computation according to the neuromorphic data in the synaptic array,
wherein the synaptic array includes:
  a plurality of input lines respectively connected to a plurality of axon circuits to receive input signals based on the neuromorphic data, independently of each other;
  a plurality of bit lines spaced apart from the plurality of input lines, each bit line outputting an output current according to the artificial neural network computation, the plurality of bit lines outputting the output currents independently of each other;
  a plurality of neuron circuits respectively connected to the plurality of bit lines to sum the output currents and output a summed output current as an output signal when it is more than a predetermined threshold;
  a plurality of electrode pads stacked and arranged at predetermined intervals between the plurality of input lines and the plurality of bit lines;
  a plurality of memristor through-structures, each passing through the plurality of electrode pads to be connected between any one of the input lines and one of the bit lines to form a current path of the output current;
  a plurality of string select transistors respectively disposed between the plurality of memristor through-structures and the plurality of bit lines; and
  a decoder connected to each of the plurality of electrode pads to apply a word line selection signal and a string selection signal.

12. The neuromorphic device as claimed in claim 11, wherein each of the memristor through-structures is formed in a pillar shape having a pillar oxide at its center and surrounded by layers in the order of a resistive material layer, a polysilicon oxide layer, and a gate insulating film.

13. The neuromorphic device as claimed in claim 12,
wherein the word line selection signal includes a pass voltage and an off voltage, and in the memristor through-structure, a region corresponding to an electrode pad to which the pass voltage is applied is the polysilicon oxide layer in which the current path is formed, and
wherein a region corresponding to an electrode pad to which the off voltage is applied is the resistive material layer in which the current path is formed to output the output current to a corresponding one of the plurality of bit lines.

14. The neuromorphic device as claimed in claim 11,
wherein the synaptic array includes at least two layers containing at least two resistive memristor elements corresponding to each electrode pad of the plurality of electrode pads in a memristor through-structure of the memristor through-structures, and
wherein a number of resistive memristor elements included in the corresponding layer is changed according to the string selection signal.

15. The neuromorphic device as claimed in claim 11,
wherein a first synaptic array and a second synaptic array are connected in series, and
wherein the first synaptic array and the second synaptic array are spaced apart in a first direction or a second direction, and share the plurality of electrode pads for each layer.

16. The neuromorphic device as claimed in claim 15,
wherein a first artificial neural network computation is performed in a first layer of the first synaptic array in response to an input signal of the input signals, and a second artificial neural network computation is performed in a second layer of the second synaptic array in response to an intermediate signal output from the first synaptic array to generate the output signal, and
wherein the first layer and the second layer are activated by a same word line selection signal.

17. The neuromorphic device as claimed in claim 11, wherein the synaptic array includes a plurality of latch circuits respectively connected between the plurality of neuron circuits and the plurality of input lines to store the output signal.

18. The neuromorphic device as claimed in claim 17, wherein the neuromorphic device performs a first artificial neural network computation in a first layer of the synaptic array in response to an input signal of the input signals and stores an intermediate signal output from a neuron circuit of the plurality of neuron circuits in a latch circuit of the plurality of latch circuits, and performs a second artificial neural network computation in a second layer of the synaptic array in response to the stored intermediate signal and outputs the output signal from the neuron circuit.

19. An operating method of a neuromorphic device including at least one three-dimensional synaptic array having a plurality of layers, the operating method comprising:
- upon receiving a plurality of input signals independent of each other, performing an artificial neural network computation on the input signals in a plurality of resistive memristor elements of a layer corresponding to a word line selection signal;
- as a result of the artificial neural network computation, outputting a plurality of output currents to neuron circuits through bit lines;
- summing the output currents to output a summed output current as an output voltage when it is more than a predetermined threshold; and
- wherein the three-dimensional synaptic array performs the artificial neural network computation independently for each layer activated by the word line selection signal.

20. The operating method as claimed in claim 19, wherein the neuromorphic device includes a first synaptic array and a second synaptic array electrically connected in series and spaced apart from each other, the operating method further comprising:
- outputting, to the second synaptic array, an intermediate signal obtained by performing a first artificial neural network computation in a first layer of the first synaptic array in response to an input signal of the plurality of input signals; and
- generating the output current by performing a second artificial neural network computation in a second layer of the second synaptic array in response to the intermediate signal,
- wherein the first layer and the second layer are activated by a same word line selection signal.

* * * * *